United States Patent
Banerjee et al.

(10) Patent No.: US 10,730,270 B2
(45) Date of Patent: Aug. 4, 2020

(54) METALLIZED POLYETHYLENE LAMINATES

(75) Inventors: Mrinal Kanti Banerjee, Mumbai (IN); Chandrashekhar Ramchandra Abhyankar, Mumbai (IN)

(73) Assignee: Essel Propack Ltd., Mumbai (IN)

(*) Notice: Subject to any disclaimer, the term of this patent is extended or adjusted under 35 U.S.C. 154(b) by 1418 days.

(21) Appl. No.: 14/237,574

(22) PCT Filed: Aug. 1, 2012

(86) PCT No.: PCT/IN2012/000537
§ 371 (c)(1),
(2), (4) Date: Jun. 19, 2014

(87) PCT Pub. No.: WO2013/046224
PCT Pub. Date: Apr. 4, 2013

(65) Prior Publication Data
US 2014/0295118 A1 Oct. 2, 2014

(30) Foreign Application Priority Data
Aug. 8, 2011 (IN) .......................... 2229/MUM/2011

(51) Int. Cl.
*B32B 27/08* (2006.01)
*B32B 27/32* (2006.01)
(Continued)

(52) U.S. Cl.
CPC ............... *B32B 27/08* (2013.01); *B32B 1/08* (2013.01); *B32B 7/12* (2013.01); *B32B 27/308* (2013.01);
(Continued)

(58) Field of Classification Search
CPC ......... B32B 27/08; B32B 7/12; B32B 27/308; B32B 27/32; B32B 1/08; B32B 2250/246;
(Continued)

(56) References Cited

U.S. PATENT DOCUMENTS 3,740,287 A * 6/1973 Eichorn .................. B32B 27/00
156/272.2
4,297,187 A 10/1981 Deguchi et al.
(Continued)

FOREIGN PATENT DOCUMENTS

EP 0154428 B1 * 8/1990 ............. B32B 15/08
EP 2055474 A2 5/2009
WO 2008112322 A2 9/2008

OTHER PUBLICATIONS

International Search Report issued in PCT/IN12/00537 dated Apr. 19, 2013 (3 pages).
(Continued)

*Primary Examiner* — Aaron Austin
*Assistant Examiner* — Kevin C Ortman, Jr.
(74) *Attorney, Agent, or Firm* — Osha Liang LLP

(57) ABSTRACT

The present disclosure provides a metallized polyethylene laminate comprising: an outer polyethylene layer; a metallized acid copolymer layer; an inner polyethylene layer in contact with the metallized acid copolymer layer; and optionally an extruded polyethylene layer; and a sealant layer of polyethylene.

9 Claims, 2 Drawing Sheets

(51) Int. Cl.
*B32B 1/08* (2006.01)
*B32B 7/12* (2006.01)
*B32B 27/30* (2006.01)
*F16L 9/17* (2006.01)
*F16L 9/12* (2006.01)
*F16L 9/133* (2006.01)
*F16L 9/147* (2006.01)
*F16L 11/04* (2006.01)

(52) U.S. Cl.
CPC ........ *B32B 27/32* (2013.01); *B32B 2250/242* (2013.01); *B32B 2250/246* (2013.01); *B32B 2255/10* (2013.01); *B32B 2255/205* (2013.01); *B32B 2307/7242* (2013.01); *B32B 2307/7246* (2013.01); *B32B 2439/70* (2013.01); *B32B 2553/00* (2013.01); *F16L 9/121* (2013.01); *F16L 9/133* (2013.01); *F16L 9/147* (2013.01); *F16L 9/17* (2013.01); *F16L 2011/047* (2013.01); *Y10T 428/1393* (2015.01); *Y10T 428/24975* (2015.01); *Y10T 428/269* (2015.01); *Y10T 428/31692* (2015.04)

(58) Field of Classification Search
CPC ....... B32B 2307/7242; B32B 2250/242; F16L 9/147; F16L 2011/047; F16L 9/133; F16L 9/17; F16L 9/121; Y10T 428/31692
USPC .... 428/336, 323, 423.1, 141, 220, 327, 339, 428/161, 212, 216, 447, 461, 474.4, 522, 428/523, 143, 144, 195.1, 215, 317.9, 428/331, 335, 342, 343, 34.1, 34.2, 35.8, 428/36.91, 402, 411.1, 414, 416, 421, 428/422.8, 448, 454, 457, 458, 480, 483, 428/500, 516
See application file for complete search history.

(56) References Cited

U.S. PATENT DOCUMENTS

| | | | |
|---|---|---|---|
| 5,192,620 A * | 3/1993 | Chu | .......................... C08J 7/047 427/171 |
| 6,190,760 B1 | 2/2001 | Nagai et al. | |
| 7,494,605 B2 | 2/2009 | Dayrit et al. | |
| 7,588,706 B2 * | 9/2009 | Van Loon | ................. B32B 7/10 264/173.14 |
| 2004/0072004 A1 | 4/2004 | Migliorini et al. | |
| 2005/0058793 A1* | 3/2005 | Schaefer | ................. B32B 15/08 428/35.7 |
| 2006/0127658 A1* | 6/2006 | Schulz | .................... B32B 15/08 428/215 |
| 2006/0159877 A1 | 7/2006 | Nomula | |
| 2007/0160789 A1 | 7/2007 | Merical et al. | |
| 2008/0226854 A1 | 9/2008 | Trouilhet | |
| 2009/0110888 A1 | 4/2009 | Wuest et al. | |
| 2011/0274892 A1 | 11/2011 | Chang et al. | |

OTHER PUBLICATIONS

Extended European Search Report issued in corresponding European Application No. 12837599.5 dated Mar. 16, 2015 (6 pages).

* cited by examiner

METALLIZED POLYETHYLENE LAMINATES

TECHNICAL FIELD

The present disclosure relates to a metallized polyethylene laminate. The metallized polyethylene laminate of the present disclosure can be made into articles for storing items like food, as well as cosmetics, where texture and aroma need to be retained. The articles show enhanced vapor and or gas barrier characteristics as compared to articles made from laminates known in the art. The present disclosure further relates to a process of manufacturing said metallized polyethylene laminate

BACKGROUND

Conventionally laminates are used in large quantities for packaging and dispensing of various products, including personal care and food products. The laminates are usually made of plastic polymers because of the inherent properties, such as physical properties of strength, light weight, durability, non-toxicity, resistance to light and heat, and inertness towards chemicals. Such properties make laminates an appropriate choice for application in packaging industry.

Metallized polymer laminates are laminates with a thin layer of a metal deposited or coated on the surface of a polymer layer. This metallization of laminates imparts a glossy metallic appearance at a reduced weight. Further, metallized films provides barrier for protection against elements including light, water, moisture and gases. Metallized polyester and BOPP are commonly known in the flexible laminate manufacturing industry. These laminates are usually formed by using one of the components as a metallized layer and bonded to the sealant layer using solvent-based or solvent-less adhesives.

Biaxially oriented polypropylene (BOPP) films are widely used as films for packaging, since they are excellent in moisture barrier properties, strength, clarity and surface gloss, and it is also widely practiced to metalize them by a metal such as aluminum, for the purposes of making them look better because of the metallic gloss when displayed, improving the gas barrier properties, and inhibiting the deterioration of the packaged product otherwise caused by external light such as ultra violet light from sun light rays.

However since the surface of a BOPP film is inactive, it is generally practiced to activate the surface by such treatment as corona discharge treatment or flame treatment, for improving the adhesion between the metallic film and the base material film at the time of metallization.

U.S. Pat. No. 4,297,187 discloses corona discharge treatment in a mixed gas consisting of nitrogen and carbon dioxide. However, in the corona discharge treatment method, a higher treatment intensity can activate the surface more and improves the adhesive strength between the metallic film and the surface layer of the base material film, but it is known that, at the same time, the base material is deteriorated and therefore that the surface layer of the base material film is likely to be delaminated from the inside of the base material film.

U.S. Pat. No. 6,190,760 discloses a biaxially oriented polypropylene film to be metallized including a surface layer made of a polypropylene resin with the endothermic main peak of crystal fusion in a range of 155 deg C. to 163 deg C. and with a heat of crystal fusion 20 to 90 m J/g, being laminated layer at least one side of the base layer made of isotactic polypropylene; and the wetting tension of the surface layer, being 33 to 55 Mn/M. U.S. Pat. No. 6,190,760 also discloses a metallized biaxially oriented polypropylene film, including a thin metallic film, being laminated on the surface layer said biaxially oriented polypropylene film to be metallized. U.S. Pat. No. 6,190,760 also further discloses a laminate obtained by using said metallized biaxially oriented polypropylene film. US 2011/0274892 discloses biaxially oriented film including bio based polyolefin which is derived from non-petroleum sourced monomers. US 2011/0274892 also discloses a laminate film including at least one bio-based polyolefin layer including at least 53 pMC of radiocarbon (14C) content. The laminate film may include additional layers such as a second bio-based polyolefin resin-containing layer of at least 53 pMC radiocarbon content, and a metal layer.

Metallized polymer films are widely used for food packaging and also for decorative purposes. US2008/0226854 describes metallized films with metal layers coated on one or more ethylene acid copolymers, with another thermoplastic layer. The prior arts discussed are incorporated in its entirety herein by reference.

In the packaging industry, metallized films are preferred as it enhances the shelf life and appeal of the packaged product. Metallized films have become a good replacement of metal cans, glass or rigid structures in packaging, the requirement of barrier materials and coex structures.

SUMMARY

The present disclosure relates to a metallized polyethylene laminate comprising: an outer polyethylene layer; a metallized acid copolymer layer; an inner polyethylene layer in contact with the metallized acid copolymer layer; and optionally an extruded polyethylene layer; and a sealant layer of polyethylene.

These and other features, aspects, and advantages of the present subject matter will become better understood with reference to the following description. This summary is provided to introduce a selection of concepts in a simplified form. This summary is not intended to identify key features or essential features of the disclosure, nor is it intended to be used to limit the scope of the subject matter.

BRIEF DESCRIPTION OF THE DRAWINGS

The above and other features, aspects, and advantages of the subject matter will be better understood with regard to the following description, and accompanying drawings where.

DETAILED DESCRIPTION

Figure 1:
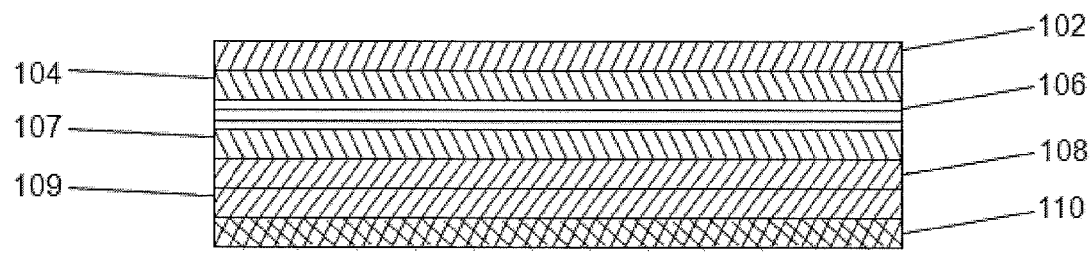
FIG. 1 shows a metallized polyethylene laminate according to an embodiment of the present subject matter.

The present disclosure provides a metallized polyethylene laminate comprising: an outer polyethylene layer; a metallized acid copolymer layer; an inner polyethylene layer in contact with the metallized acid copolymer layer; and optionally an extruded polyethylene layer; and a sealant layer of polyethylene. In another aspect, the present disclosure also provides laminated articles made of such laminate.

Laminates are generally made of a plurality of layers or films bonded together either by using hot polymer melt in extrusion or by using an adhesive. Generally, the laminates are formed as three layers namely an outer layer, a middle layer, and an inner layer, having a tie layer each between the outer layer and the middle layer and between the middle layer and the inner layer. The outer layer usually serves as the printing layer and is composed mainly of polyethylene. The middle layer of the laminate is usually formed of aluminum or ethyl vinyl alcohol (EVOH), Nylon (Poly amide), and serves as a barrier layer to atmospheric air and moisture. Presently tubes made out of laminated layers are made including an aluminum barrier laminate (ABL) or a plastic barrier laminate (PBL). The inner layer of the laminate is mainly composed of polyethylene and serves as the sealant layer. When the laminate has been processed and formed into a storage container, the inner layer prevents contact between contents packaged in the storage container and the middle layer. The tie layer between the different layers serves as an adhesive to bind the layers together and form the laminate. Furthermore, the laminates may be formed as multilayered as well.

Generally, metallization of polymeric films are beneficial as suitable barrier properties are conferred on the polymeric film laminates. This is suitable where perishable items like food, items such as cosmetics, where texture and aroma need to be retained. Furthermore, vapor and or gas barrier characteristics are important while packaging the above mentioned items.

In an embodiment of the present disclosure the metallized polyethylene laminate further comprises an acid copolymer layer in contact with the metallized acid copolymer layer; and a second metallized acid copolymer layer in contact with the above acid copolymer layer. The said acid copolymer layer and the second metallized acid copolymer layer are between the first metallized acid copolymer layer and the inner polyethylene layer.

In yet another embodiment of the present disclosure the polyethylene layer in the metallized polyethylene laminate is a multi-layered polyethylene film; preferably, a two-layered or a three layered film. The layers can be of 30μ and 60μ thicknesses when the polyethylene film is two-layered and in case of a three-layered polyethylene film the thickness of each layer can be 30μ, 60μ and 30μ.

The sealant layer of polyethylene in the metallized polyethylene laminate can be mono-layered or multi-layered with a total thickness of 50μ. In still another embodiment of the present disclosure the sealant layer of polyethylene in the metallized polyethylene laminate is a multi-layered film, preferably a three layered film.

In another embodiment of the present disclosure the polyethylene layer in the metallized polyethylene laminate is a combination of linear low density polyethylene and low density polyethylene. According to this embodiment the outer and the inner polyethylene layers of the metallized polyethylene laminate can be a combination of linear low density polyethylene and low density polyethylene. Low density polyethylene typically has density in the range of 0.918 g/cc to 0.935 g/cc, preferably 0.918 g/cc; and Linear low density polyethylene has density in the range of 0.912 g/cc to 0.940 g/cc, preferably 0.927 g/cc.

In yet another embodiment of the present disclosure the acid copolymer in the metallized polyethylene laminate is ethylene acrylic acid copolymer. Various acid copolymers that can be used in the metallized polyethylene laminate according to the present disclosure are for example Escore from EXXON MOBIL, Primacore from DOW and Nucrel from Dupont with varying percentages of Acid content in the range of 7% to 9%.

Ethylene acrylic acid (EAA) as acid copolymer confers good metal adhesion properties to the homopolymer film. The EEA layer acts as a polar surface, and achieves good bonding with the metal film. This in turn allows the homopolymer film to be bonded with the metal film.

The metal film may be aluminum of predetermined thickness in the range of 40-700 Angstrom units. In a preferred embodiment, the metallic film is aluminum.

In another embodiment, the metallized polyethylene laminate comprises of a multilayer polyethylene film with at least one layer of an acid copolymer followed by an adhesive or a tie layer, that joins the multilayer polyethylene film with at least one layer of an acid copolymer which is metallized, to another polyethylene mono or a multilayer with at least one layer of an acid copolymer which is also metallized.

Preferably, the present disclosure provides a metallized polyethylene laminate comprising: an outer polyethylene multi-layer of total thickness 120μ; an acid copolymer layer in contact with said polyethylene multi-layer, of thickness 25μ; a metallized acid copolymer layer in contact with the acid copolymer layer of thickness 25μ; an inner polyethylene layer in contact with the metallized acid copolymer layer of thickness 75μ; an extruded polyethylene layer of thickness 25μ; and a sealant layer of polyethylene of thickness 50μ.

Still another embodiment of the present disclosure provides a metallized polyethylene laminate comprising: an outer polyethylene multi-layer of total thickness 90μ; a metallized acid copolymer layer in contact with said polyethylene multi-layer, of thickness 30μ; an acid copolymer layer in contact with the metallized acid copolymer layer of thickness in the range of 20μ to 30μ; another metallized acid copolymer layer in contact with the above acid copolymer layer; of thickness 30μ; and an inner polyethylene layer in contact with the above metallized acid copolymer layer of thickness 90μ.

In an embodiment of the present disclosure, FIG. 1 illustrates an exemplary structure of the laminate. The multilayered metallized laminate 100 according to FIG. 1 includes at least one polyethylene (PE) film 102, at least one acid copolymer film 104, preferably ethyl acrylic acid (EAA) and at least one metal film 106, preferably aluminum film. The metal film 106 is deposited onto a surface of an EAA layer 107 having a PE film 108. Hereinafter, the polyethylene film 102 may be referred to interchangeably as the PE film 102, and the acid copolymer film 104 may be referred to interchangeably as the EAA film 104.

In one implementation, the PE film 102 is multilayered, which can be a two layer or a three layer film. In case of a two layer PE film 102, the layers can be of 30μ and 60μ thickness. In case of a three layer PE film 102, the thickness of each layer can be 30μ, 60μ and 30μ.

In the metallized laminate 100 of FIG. 1, the PE film 108 is in contact with an extrusion layer of polyethylene 109, followed by a sealant layer 110 of PE which can be mono layered or multilayered. This PE sealant layer 110 is preferably a three layered film.

Figure 2:
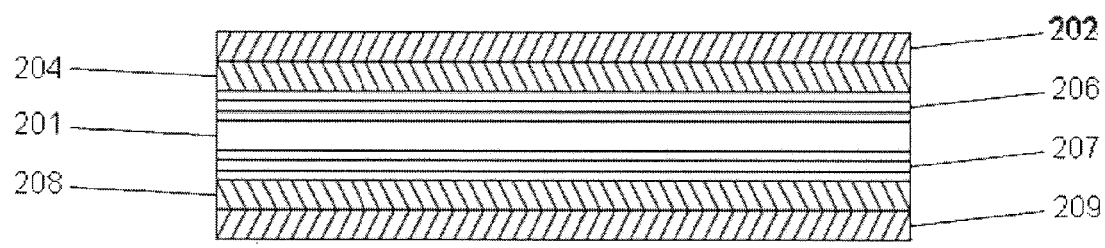
FIG. 2 shows the metallized polyethylene laminate according to another embodiment of the present subject matter.

In another embodiment of the present disclosure, FIG. 2 illustrates another exemplary structure of the laminate of the present subject matter. FIG. 2 provides a metallized laminate 200 comprising of a PE film 202 with an acid copolymer layer 204 which is metallized with a metal layer 206. The metallized layer 206 is in contact with a tie or an adhesive layer 201. This tie layer 201 joins the metallized layer 206 with another metal layer 207. The metal layer 207 is a layer metallized on an acid copolymer layer 208 having PE film 209. The PE films 202 and 209 can be multilayered films.

The metallized polyethylene laminate of the present disclosure can be prepared by using means of vacuum metallization or plasma treatment or plasma metallization. Preferably, the process for metallization for obtaining the metallized polyethylene laminate is by using plasma treatment. Plasma treatment increases the surface area to be metallized and facilitates the metallization process.

Plasma interacts with the surface of the web in variety of ways in addition to removing moisture and other organic contaminants and dust particles. It also acts to increase the number of nucleation sites through the introduction of polar groups resulting in coating with homogeneous surface morphology and less defects thereby facilitating high metal adhesion, and good bond strength of metal for the metallized film. It also helps in enhancing barrier properties of the film.

Figure 3:
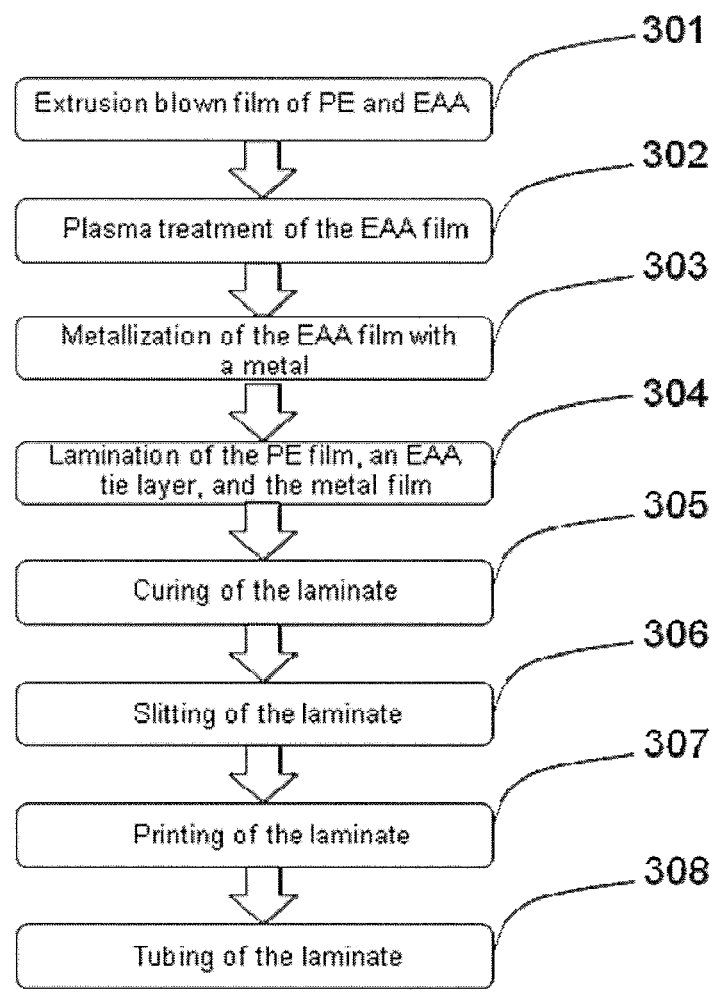
FIG. 3 shows a process of producing the metallized laminate as shown in FIG. 1 or FIG. 2 according to an embodiment of the present subject matter.

In yet another embodiment of the present disclosure, FIG. 3 illustrates a process by which the metallized laminate of the present subject matter is prepared. In step 301, the PE film is produced by an extrusion blown film of PE and EAA. As a result, the PE film is coated with the EAA film on one side. In step 302, the EAA film is then plasma treated, by passing high temperature fluidized plasma over a surface of the EAA film to make the EAA film suitable for metallization. Further, in step 303, the EAA film is then metallized with a metal. Finally in step 304, the PE film, the EAA tie layer and the metal are laminated. The lamination can be with another metallized PE film with an EAA layer, having a tie or an adhesive layer to join the two metallized PE films. The lamination can also be with the metallized PE film with a non-metallized PE film having an EAA layer and Extrusion PE layer Steps 305 to 306 illustrate conventional tube manufacturing steps, where the laminate is cured in the step 305, subsequently the laminate is slited in the step 306. Further the now slit laminate is printed in step 307 and finally a tubing process is performed in a step 308.

In an embodiment of the present disclosure the metallized polyethylene laminate can be made into a laminate tube.

EXAMPLES

The disclosure will now be illustrated with working examples, which is intended to illustrate the working of the disclosure and not intended to take restrictively to imply any limitations on the scope of the present disclosure. Other embodiments are also possible.

Example 1

A three-layered outer polyethylene film having a total thickness of 120μ is in contact with a tie layer of ethylene acrylic acid having a thickness of 25μ. The tie layer binds the polyethylene layer to a metallized ethylene acrylic acid layer also having a thickness of 25μ. The metallized ethylene acrylic acid layer is in contact with another multi-layered polyethylene film having a combined thickness of 75μ. This multi-layered polyethylene film is bound to a multi-layered sealant layer by an extruded layer of polyethylene having a thickness of 25μ. The structure of the metallized polyethylene laminate is as given below:
30 μPE/60 μPE/30 μPE//25 μEAA (tie Layer)//metallized film 25 μEAA/50 μPE/25 μPE//25 μEXtr PE (tie layer)//12.5 μPE/25 μPE/12.5 μPE.

Example 2

A two layered outer polyethylene film having a total thickness of 90μ is in contact with a metallized ethylene acrylic acid layer having a thickness of 30μ which in turn is bound to another metallized ethylene acrylic acid layer having a thickness of 30μ by a tie layer of ethylene acrylic acid having thickness in the range of 20μ to 30μ. A two-layered inner polyethylene film having a thickness of 90μ is in contact with the above metallized ethylene acrylic acid layer.

The structure of the metallized polyethylene laminate is as given below:
30 μPE/60 μPE/metallized 30 μEAA//20μ to 30μ tie or adhesive layer (EAA)//metallized 30 μEAA/60 μPEE/30 μPE.

The previously described versions of the subject matter and its equivalent thereof have many advantages, including those which are described below:

1. The present disclosure provides metallized polyethylene laminates which when made into articles exhibit good gas and vapor barrier properties.
2. The present disclosure enhances the product appeal.
3. The present disclosure also provides metallized polyethylene laminates in a cost effective way.

Although the subject matter has been described in considerable detail with reference to certain preferred embodiments thereof, other embodiments are possible. As such, the spirit and scope of the disclosure should not be limited to the description of the preferred embodiment contained therein.

We claim:

1. A metallized polyethylene laminate comprising:
   an outer polyethylene layer;
   a first metallized acid copolymer layer;
   a non-metallized acid copolymer tie layer;
   a second metallized acid copolymer layer; and
   an inner polyethylene layer in contact with the second metallized acid copolymer layer;
   wherein said non-metallized acid copolymer layer and the second metallized acid copolymer layer are between the first metallized acid copolymer layer and the inner polyethylene layer;
   wherein the first metallized acid copolymer layer and the second metallized acid copolymer layer consist of a metal layer metallized on ethylene acrylic acid and wherein the first and second metallized acid copolymer layers are in direct contact with the non-metallized acid copolymer tie layer, so that the non-metallized acid copolymer tie layer joins the first and second metallized acid copolymer layers.

2. The metallized polyethylene laminate as claimed in claim 1 comprising:
   an outer polyethylene multi-layer of total thickness 90 μm;
   a first metallized acid copolymer layer in contact with said outer polyethylene multi-layer, of thickness 30 μm;
   a non-metallized acid copolymer layer in contact with the first metallized acid copolymer layer of thickness in the range of 20 μm to 30 μm;
   a second metallized acid copolymer layer in contact with the non-metallized acid copolymer layer of thickness 30 μm; and
   an inner polyethylene layer in contact with the second metallized acid copolymer layer of thickness 90 μm.

3. The metallized polyethylene laminates as claimed in claim 1, wherein at least one of the outer polyethylene layer and the inner polyethylene layer is a multi-layered polyethylene film.

4. The metallized polyethylene laminate as claimed in claim 1, wherein the non-metallized acid copolymer tie layer consists of ethylene acrylic acid.

5. The metallized polyethylene laminate as claimed in claim 1, wherein at least one of the outer and inner polyethylene layers is a combination of linear low density polyethylene and low density polyethylene.

6. A laminate tube made from the metallized polyethylene laminate as claimed in claim 1.

7. The metallized polyethylene laminate as claimed in claim 1, wherein the first metallized acid copolymer layer or the second metallized acid copolymer layer comprises a plasma treated ethylene acrylic acid with a metal deposited thereon.

8. The metallized polyethylene laminate as claimed in claim 1, wherein the first metallized acid copolymer layer or the second metallized acid copolymer layer are prepared by at least one of vacuum metallization, inline plasma treatment, or plasma metallization.

9. A metallized polyethylene laminate comprising:
- an outer polyethylene layer;
- a first metallized acid copolymer layer;
- a non-metallized acid copolymer tie layer;
- a second metallized acid copolymer layer; and
- an inner polyethylene layer in contact with the second metallized acid copolymer layer;
- wherein said non-metallized acid copolymer layer and the second metallized acid copolymer layer are between the first metallized acid copolymer layer and the inner polyethylene layer;
- wherein the first metallized acid copolymer layer and the second metallized acid copolymer layer consist of a metal layer metallized on ethylene acrylic acid, wherein the first metallized acid copolymer layer or the second metallized acid copolymer layer comprises a plasma treated ethylene acrylic acid with a metal deposited thereon.

* * * * *